Jan. 24, 1961 H. FALLER 2,969,472
MINIATURE ELECTRIC MOTOR
Filed Jan. 11, 1957

INVENTOR
HERMANN FALLER

# United States Patent Office 2,969,472
Patented Jan. 24, 1961

2,969,472

MINIATURE ELECTRIC MOTOR

Hermann Faller, Hauptstrasse 26, Gutenbach,
Black Forest, Germany

Filed Jan. 11, 1957, Ser. No. 633,716

Claims priority, application Germany Jan. 12, 1956

8 Claims. (Cl. 310—82)

The present invention relates to a new minature electric motor for alternating current, particularly for the operation of toys, and especially to such a motor which is adapted to run on a low voltage.

Miniature motors previously designed for this purpose have generally been of the same basic design as larger motors built for industrial purposes, differing therefrom only in minor details. They are therefore too expensive for the present purposes and, by being of such a small size but of a design really intended for much larger motors, they also have the disadvantage of easily becoming defective, especially if they cannot start of their own accord and are thus temporarily subjected to excessive heating.

It is an abject of the present invention to provide a new type of electric motor for alternating current which is especially designed to be built in relatively small dimensions so as to be used for driving small models, toys, and other small machinery, and to overcome the disadvantages of previous miniature motors.

A further object of the present invention is to provide a miniature electric motor which is of a very simple design and construction, may be built at a low cost, does not interfere with clear radio or television reception, does not become unduly heated even though it may be prevented from properly rotating for prolonged periods of time, and is safe and reliable in operation and handling by only requiring a low voltage as supplied, for example, by a bell transformer or the like.

One essential feature of the new motor through which some of the disadvantages of prior miniature motors are overcome is the fact that its rotating armature does not itself carry any current and that therefore there are no sliding contacts or connections leading thereto which might be the cause of different kinds of disturbances and breakdowns.

The above-mentioned advantages of the new miniature motor are due primarily to the fact that its design and operation are based upon an entirely new principle. It consists in superimposing a preferably constant, unidirectional magnetic field upon the alternating magnetic field of a coil which is connected to a source of alternating current, and in converting the oscillatory movements of an iron armature, which are primarily produced by the combined action of the two magnetic fields, into a substantially constant rotary movement.

In this connection, it is of practical importance to mention that this conversion of one type of motion into another is not produced by a rotating magnetic field but by generating oscillatory movements by mechanical means. For this purpose, the present invention utilizes a principle which, although known as such, has previously been disregarded or at least not been applied for similar purposes. It consists in converting a reciprocatory motion of insufficient stability produced by electricity into a more stable and uniform rotary motion by the intermediary of a revolving or rolling motion.

Depending upon the type of bearing used for mounting the armature of the motor, the primary oscillatory movements thereof may be either in the form of rotary oscillations of a rotatably mounted armature about the rotary axis thereof or angularly inclined oscillations of an iron core or magnet which is pivotally mounted, for example, in an enlarged central channel of a solenoid.

Further objects, features, and advantages of the present invention will be apparent from the following detailed description thereof, particularly when read with reference to the accompanying drawings, in which—

Figure 1:
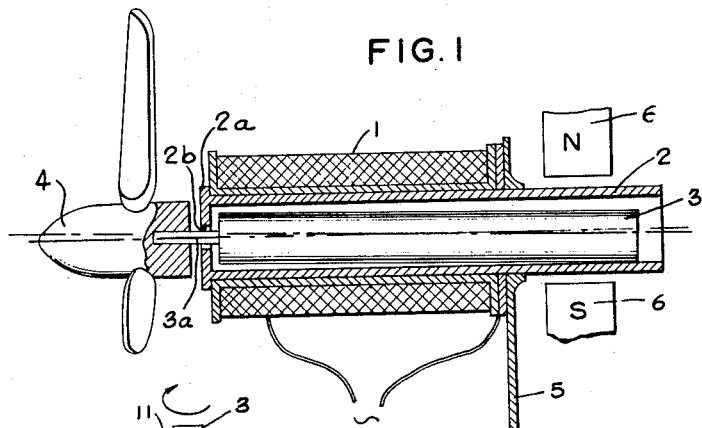
Fig. 1 shows a vertical cross section of the basic design of the new motor.
Figure 4:
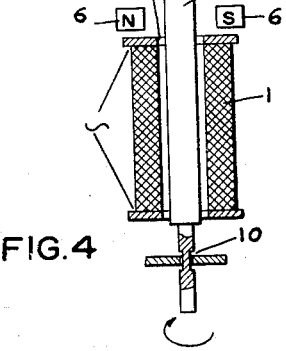
Figure 5:
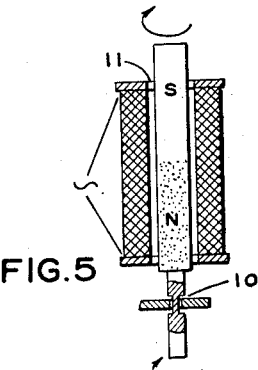
Figure 6:
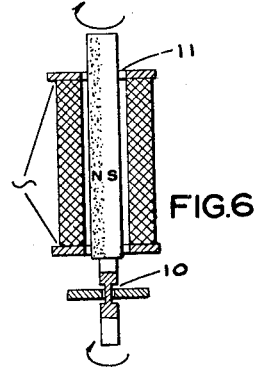
Figure 7:
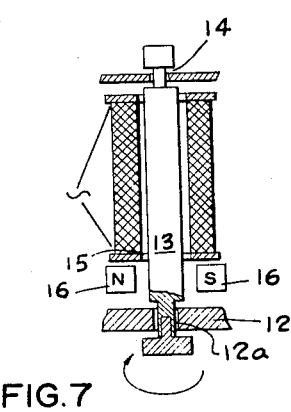
Figure 8:
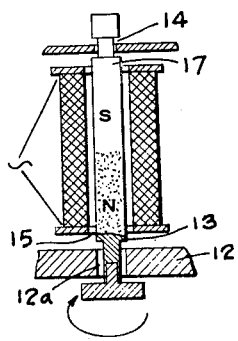

Figs. 4, 5 and 6, respectively, show diagrammatic horizontal cross sections of a miniature motor according to the invention with a bearing structure for supporting the movable iron core similarly as shown in Fig. 1, but illustrate three different possibilities of superimposing the constant magnetic field upon the alternating field; while Figs. 7 and 8 show similar views of the miniature motor according to the invention as shown in Figs. 4 to 6, respectively, but illustrate a modified manner of operating the same.

Figure 2:
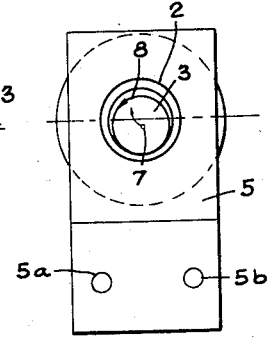
Fig. 2 shows a side view of the motor as shown in Fig. 1.
Figure 3:
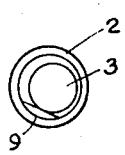
Fig. 3 shows a modification of the shape of the coil channel as illustrated in Fig 2.

Referring to the drawings, and first particularly to Figs. 1 to 3, the new miniature motor consists of a solenoid 1 which is to be connected to a source of alternating current and has a central cylindrical cavity and a tubular member 2 therein consisting, for example, of brass, one open end of which projects from one end of the solenoid cavity, while its other end is preferably closed by a plate 2a having a central bearing aperture 2b. Tube 2 accomodates a core 3 of soft iron of a diameter smaller than the inner diameter of the tube and also projecting a certain distance beyond the end of solenoid 1. At its other end, core 3 carries a thin shaftlike extension 3a which passes so loosely through aperture 2b in plate 2a that the latter not only serves as a bearing for supporting core 3 for rotary movement therein about its own axis but also permits core 3 to wobble therein. The outer end of pin 3a may be provided with suitable driving means, such as a pulley or gear, or may be directly connected to the part to be driven, for example, a propeller or fan 4 which may be firmly attached to pin 3a which, if desired, may for this purpose be made of a conical shape. For convenient mounting of the motor, a plate 5 consisting, for example, of brass or the like may be secured to the other end of coil 1, for example, by being flanged or pressed upon tube 2, and may, in turn, be mounted in a fixed position by means of bolts passing through holes 5a and 5b therein.

If solenoid 1 is connected to an alternating current, it will be noticed that the iron core 3 within tube 2 carries out small vibrations. If a small horseshoe magnet 6 is then mounted on a stationary part of the motor so that its two poles at both sides of tube 2 can act through said tube upon the pivotable iron core 3, the latter will automatically carry out a strong rotary movement about its longitudinal axis and thereby drive fan 4. This rotation is not caused by a rotary magnetic field, nor is generally the direction of such rotation changed even though the direction of the constant magnetic field might be reversed. The direction of rotation may be controlled by a suitable design of the features responsible for the original starting movement, primarily by placing the iron core 3 within brass tube 2 into a suitable starting positon or by giving the inner wall of tube 2 of a suitable shape and size so as to promote the proper starting conditions. Due to the alternating magnetic field within iron core 3, the latter is acted upon by the polarized field of magnet 6 to carry out a reciprocatory movement of either swinging back and forth or upwardly and downwardly, depending upon the phase of the alternating field or the reversal of polarity of the magnet. Since core 3 is loosely disposed within tube 2 and also loosely mounted within bearing aperture 2b in plate 2a so as to rest on the lower surface thereof when not in operation, the first vibration impulse to which it is subjected when coil 1 is connected to the current is not directed diametrically of tube 2 through the center thereof but slightly diagonally and laterally past the center, as indicated by the arrow 7 in Fig. 2. Thus, even this first eccentric movement of core 3 within tube 2 results in a rotary motion thereof so that it will start to roll, following a curved path along the inner wall of tube 2. This curve may be called the "directrix" of the rolling or revolving movement of core 3. In this rolling movement, core 3 wobbles within a conical space, the apex of which lies within bearing 2b and the outer generatrix of which is determined by such directrix, that is, in this case, by the inner wall of tube 2. Through such rolling motion, core 3 also receives a rotary motion about its own longitudinal axis which is transmitted to the propeller or fan 4 at its outer end.

Fig. 2 illustrates more specifically how this rotation of core 3 develops and that the two rotary motions, that is, the motion of the longitudinal axis of core 3 along a conical path and the rotary motion thereof about its longitudinal axis are dependent upon each other. If the first movement occurs in the direction of arrow 7, the latter movement must occur in the direction of arrow 8. If the first movement would occur in the opposite direction, the second would also run in direction opposite to that of arrow 8. The original direction of rotation depends less upon the operating conditions than upon those prevailing when the motor is at rest, particularly upon whether the first vibration impulse of core 3 is directed past the left or right side of the center of the directrix.

If the motor should be designed so as to run in one particular direction, the present invention further provides for the directrix formed by the inner wall of tube 2 to be given a shape slightly deviating from a circular shape. For this purpose, that is, to direct the vibration impulses so as to be more easily converted into a strong rotary motion, a small flattened inward projection 9, as shown in Fig. 3, may, for example, be provided on the inner wall of tube 2, or the directrix may be given, for example, an elliptical or polygonal shape. The same effect may, however, also be attained by various other means, for example, by giving the directrix a circular shape as shown in Fig. 2, but by making the iron core of a noncircular cross section.

After the rotation has once been started in one or the other direction, it will also be maintained by the moment of inertia of the moving body of the core and it will have the tendency to adjust itself to a speed in tune with the frequency of the alternating current. The attenuation of the rotary movement will then be overcompensated by the energy of the continuously repeated vibration impulses.

Fig. 4 once more illustrates diagrammatically the propulsion principle as above described with reference to Figs. 1 to 3. Iron core 3 is likewise mounted in a bearing 10 so as to be rotatable about its longitudinal axis and also to permit a movement of this axis along a conical path. Brass tube 2 as shown in Figs. 1 to 3 has, however, been omitted as being nonessential if the north and south magnetic poles of magnet 6 are spaced sufficiently from core 3 so that the latter when moving will not hit against them and will not be magnetically arrested thereby. When in this case iron core 3 first starts to oscillate, it will strike against the curved edge at the rear end of the solenoid cavity so that the core will then roll along this curve, which forms the directrix of the movement, and will at the same time be rotated about its longitudinal axis, as previously described.

A further improvement of the miniature motor according to the invention may be attained as shown diagrammatically in Fig. 5 by the use of a steel core which is permanently magnetized in place of the soft-iron core as previously described. This steel core is magnetized longitudinally so that the south pole is disposed at the free end thereof. A separate horseshoe magnet may then be dispensed with. During the periods when the alternating current flows in a direction in which the magnetic flux through the solenoid and the flux of the longitudinal magnetization of the core are of equal direction, the position of the core will be substantially unaffected and it will remain as truly axially as possible. However, whenever the direction of the current in the solenoid is reversed, an unbalance will occur which results in an oscillatory movement of the free end of the core which then hits against the wall of the solenoid cavity and is then repelled thereby. This embodiment of the invention even has the advantage over that shown in Figs. 1 and 4 that the movement of the free end of the core past the axis is not limited to one within the plane of the drawing but that any movement past the axis has the same effect and also results in a deflection or conversion of the oscillatory movement into a rotary movement.

Instead of using a core which is magnetized so that its two poles are at opposite ends separated in longitudinal direction, it is also possible, as shown in Fig. 6, to use a steel core which is magnetized transversely. Such a core will also always tend to adjust itself so that that side thereof which is of equal polarity with the direction of the current at any particular moment will coincide with the central axis of the coil. If, therefore, at a particular moment a north-magnetic pole is formed by the alternating current at the end of the coil near the free end of the core, the latter will adjust itself to a position in which the north-magnetic side thereof coincides as much as possible with the longitudinal axis of the coil. Thus, in Fig. 6, the free end of the core will incline toward the right and will hit against the wall of the solenoid cavity, where it will be repelled so that at the next moment when the solenoid current has reversed its direction, the south-magnetic side of the core will be drawn toward the axis, and so forth. These original angularly inclining vibrations will change very quickly into the more stabilized revolving movement as previously described, wherein the curve defined by the wall of the solenoid cavity forms the directrix of this rolling movement.

All three embodiments of the invention as shown diagrammatically in Figs. 4, 5, and 6 thus have in common that the free end of the armature rolls along the curve defined by the channel wall and is thereby subjected to a rotary movement about its own longitudinal axis. Also, in all these cases, the directrix of such revolving movement is determined by the free end of the core in contact with the end of the cavity, while the other end in the form of a thin shaft passes through the bearing and carries the object to be rotated.

Figs. 7 and 8 illustrate a modification of the invention and of the manner of rotating the respective object 12 which in this case is attached to the free end 13 of the iron core, opposite to its bearing 14. However, instead of being firmly secured thereto, it is only loosely connected to the core and the free end 13 of the latter is capable of moving within an enlarged bore 12a of the object 12.

The method of mounting the armature according to Figs. 7 and 8 is not essentially different from that previously described since the iron core is movable within bearing 14 so that its longitudinal axis is able to revolve along a conical path, the apex of which is formed by bearing 14, and so that the core can also rotate about this axis. At its free end 13 the core may then use either edge 15 of the solenoid cavity as a stationary directrix of its movement, just as in the previous embodiments, or it may carry out a revolving movement within the enlarged bore 12a of the loosely attached object 12, which may thus be regarded as a movable directrix. Depending upon the particular construction used, either one or the other directrix may be used or both simultaneously. Since the core or armature which is also mounted so as to be rotatable about its own longitudinal axis is caused to carry out such rotation by rolling either along the stationary or movable directrix, it will take along and thus also rotate the loosely attached object 12 by friction.

The embodiment according to Fig. 7 corresponds to that shown in Fig. 4 insofar as the constant magnetic field is formed by a small permanent horseshoe magnet 16 with north and south poles N and S, while the embodiment according to Fig. 8 corresponds to that shown in Fig. 5 insofar as it is provided with a steel rod 17 serving as a magnetic core and magnetized longitudinally.

The amount of energy required by the new miniature motor for operating the same is so small that the current supplied, for example, by a single bell transformer of the usual cavity will be sufficient to operate 30 to 35 such motors at the same time when connected in parallel. The simple and sturdy manner of mounting the rotating armature of each of these motors allows them to be operated continuously without attendance. The dimensions of such a motor may be very small as it may be built even only about half the size of 1" x 2" shown in Fig. 1 or even smaller.

Although my invention has been illustrated and described with reference to the preferred embodiments thereof I wish to have it understood that it is in no way limited to the details of such embodiments, but is capable of numerous modifications within the scope of the appended claims.

Having thus fully disclosed my invention, what I claim is:

1. A miniature electric motor for alternating current, comprising, in combination, an electromagnetic device including a solenoid having a central cavity and being adapted to produce an alternating magnetic field within said cavity and about itself, upon energization by an alternating current applied thereto; a permanent magnet device located within the region of said alternating magnetic field and adapted to superimpose a constant magnetic field on said alternating magnetic field; one of said devices comprising a shaft member having a pivot portion and a movable portion of magnetic material, said movable portion being arranged within said cavity radially spaced from the cavity surface for being able to carry out limited transverse oscillatory movements therein in all directions under the influence of said magnetic fields; stationary support means located at one end of said cavity for supporting said pivot portion for universal movement therein including rotary motion; and annular guide means located at the opposite end of said cavity and coaxially therewith, said annular guide means surrounding with an inside guide surface a portion of said movable portion and having an inner guide surface of a diameter larger than the outer diameter of said portion of said movable portion, so that the oscillatory movement of said movable portion produced by the application of alternating current to said solenoid and the simultaneous effect of said superimposed constant magnetic field, said shaft member being caused to carry out a rotary movement by rolling with said portion of said movable portion along said inside guide surface of said annular guide means.

2. A miniature electric motor as set forth in claim 1, wherein said movable portion of said shaft member is an iron core having a portion projecting at said other end thereof beyond said opposite end of said cavity, and wherein said permanent magnet device comprises a permanent magnet having two poles located on opposite sides of said portion of said core, and spaced therefrom in transverse direction.

3. A miniature electric motor as set forth in claim 2, wherein said cavity of said solenoid is provided with an inserted tubular member of nonmagnetic material surrounding said core and radially spaced therefrom, one end of said tubular member being closed and including a central opening for supporting said pivot portion of said shaft member at one end of said core, said pivot member being loosely fitting into and extending through said central opening, and adapted to carry an object to be rotated by said miniature motor.

4. A miniature electric motor as set forth in claim 2, wherein in said contact area between said annular guide means and said core a position of rest for said core is predetermined in such a manner that the latter is located before the start of operation at least with its end portion off center of said solenoid cavity and in such a relation to said permanent magnet poles that upon energization of said solenoid said core is prevented from carrying out a substantially diametrically directed vibration within said cavity and is deflected into a revolving movement in a direction predetermined by said position of rest.

5. A miniature electric motor as set forth in claim 4, wherein said inner guide surface of said annular guide means is provided in said contact area with a substantially flat portion determining said position of rest.

6. A miniature electric motor as set forth in claim 4, wherein said core is provided with non-circular peripheral portions determining said position of rest.

7. A miniature electric motor as defined in claim 1, wherein said permanent magnet device comprises said shaft member having a movable portion consisting of a steel rod, said steel rod being longitudinally magnetized permanently so as to have opposite magnet poles at its ends superimposing a constant magnetic field upon said alternating magnetic field.

8. A miniature electric motor as defined in claim 1, wherein said permanent magnet device comprises said shaft member having a movable portion consisting of a steel rod, said steel rod being magnetized transversally so as to have opposite magnet poles on opposite sides thereof for superimposing a constant magnetic field upon said alternating magnetic field.

References Cited in the file of this patent
UNITED STATES PATENTS

| | | |
|---|---|---|
| 1,862,356 | Warren | June 7, 1932 |
| 2,393,045 | Hotchner | Jan. 15, 1946 |
| 2,437,904 | Adams et al. | Mar. 16, 1948 |
| 2,509,391 | Hansen et al. | May 30, 1950 |